United States Patent
Ikemoto

(10) Patent No.: US 7,822,247 B2
(45) Date of Patent: *Oct. 26, 2010

(54) ENDOSCOPE PROCESSOR, COMPUTER PROGRAM PRODUCT, ENDOSCOPE SYSTEM, AND ENDOSCOPE IMAGE PLAYBACK APPARATUS

(75) Inventor: Yosuke Ikemoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 833 days.

This patent is subject to a terminal disclaimer.

(21) Appl. No.: 11/748,684

(22) Filed: May 15, 2007

(65) Prior Publication Data

US 2007/0269087 A1  Nov. 22, 2007

(30) Foreign Application Priority Data

May 16, 2006 (JP) ............................. 2006-136541

(51) Int. Cl.
*G06K 9/00* (2006.01)
(52) U.S. Cl. ..................... 382/128; 382/100; 382/131; 382/130; 600/476; 600/160; 600/178; 600/101; 600/181; 348/70; 348/71; 348/73
(58) Field of Classification Search ................. 382/128, 382/100, 131, 130; 600/160, 178, 181; 348/70, 348/71, 73; 250/458.4, 461.1
See application file for complete search history.

(56) References Cited

U.S. PATENT DOCUMENTS

| 6,154,248 | A  | * | 11/2000  | Ozawa et al. ................ 348/65  |
| 6,879,339 | B2 |   | 4/2005   | Ozawa                                 |
| 6,967,673 | B2 |   | 11/2005  | Ozawa et al.                          |
| 7,050,086 | B2 | * | 5/2006   | Ozawa ......................... 348/70 |
| 7,236,621 | B2 | * | 6/2007   | Kobayashi et al. .......... 382/128   |
| 7,469,160 | B2 | * | 12/2008  | Banks et al. ................ 600/476  |
| 7,632,227 | B2 | * | 12/2009  | Sugimoto et al. ........... 600/160   |
| 7,636,464 | B2 | * | 12/2009  | Kobayashi et al. .......... 382/128   |

\* cited by examiner

*Primary Examiner*—Wes Tucker
*Assistant Examiner*—Nancy Bitar
(74) *Attorney, Agent, or Firm*—Greenblum & Bernstein, P.L.C.

(57) ABSTRACT

An endoscope processor comprising a signal receiver, an average calculator, a difference calculator, an emphasizer, a synthesizer, and an output block is provided. The signal receiver receives an image signal generated by an imaging device. The image signal comprises a plurality of pixel signals. The average calculator calculates a signal average value. The difference calculator calculates a signal difference value. The emphasizer calculates an emphasized value by multiplying the signal difference value by a predetermined gain. The synthesizer generates an emphasized image signal, in which the pixel signal for each pixel is replaced with the sum of the emphasized value for each pixel and the signal average value.

6 Claims, 3 Drawing Sheets

ENDOSCOPE PROCESSOR, COMPUTER PROGRAM PRODUCT, ENDOSCOPE SYSTEM, AND ENDOSCOPE IMAGE PLAYBACK APPARATUS

BACKGROUND OF THE INVENTION

1. Field of the Invention

The present invention relates to image signal processing that enables a user to discriminate a desired object from an entire image captured with an electronic endoscope.

2. Description of the Related Art

An electronic endoscope, having an imaging device at the end of an insertion tube, is used for medical examinations, industrial examinations, and so on. Light is irradiated from the end of the insertion tube to illuminate an object for observation. An optical image formed by the reflected light is captured by the imaging device, and the captured image is displayed on a monitor.

A medical endoscope is used for identifying abnormal tissue or a lesion of internal organs. The appearance of abnormal tissue or a lesion is different from that of healthy tissue. Based on the user's observation, the abnormal tissue or lesion can be identified.

However, the outer appearance of a lesion that exists deep under the surface of an organ is not clearly defined from that of healthy tissue. Therefore, it is often difficult to distinguish such a lesion.

SUMMARY OF THE INVENTION

Therefore, an object of the present invention is to provide an endoscope processor that carries out signal processing on the image signal generated by an electronic endoscope in order that a lesion is easily distinguishable from a displayed image which corresponds to the image signal.

According to the present invention, an endoscope processor comprising a signal receiver, an average calculator, a difference calculator, an emphasizer, synthesizer, and an output block is provided. The signal receiver receives an image signal. The image signal is generated based on an optical image captured at a light receiving surface on an imaging device. The image signal comprises a plurality of pixel signals. The pixel signals are generated by a plurality of pixels according to the amounts of received light. The plurality of the pixels are arranged on the light receiving surface on the imaging device. The average calculator calculates the signal average value. The signal average value is the average of the signal levels of the pixel signals that one frame of one field of the image signal comprises. The difference calculator calculates a signal difference value. The signal difference value is the difference between the signal level of the pixel signal for the each pixel and the signal level of the signal average value. The emphasizer calculates an emphasized value by multiplying the signal difference value by a predetermined gain. The synthesizer generates an emphasized image signal. In the emphasized image signal, the pixel signal for each pixel is replaced with the sum of the emphasized value for each pixel and the signal average value. The output block outputs the emphasized image signal.

Further, the average calculator calculates the signal average value using the pixel signals, which are filtered according to their signal level, by a higher or lower limit, or both.

Further, each of the pixels is covered with a first or second color filter. First and second pixels are covered with the first and second color filter, respectively. The first and second pixels generate first and second pixel signals, respectively. The average calculator calculates first and second signal average values. The first and second signal average values are the signal average values corresponding to the first and second pixel signals, respectively. The difference calculator calculates first and second signal difference values. The first and second signal values are the signal difference values corresponding to the first and second pixel signals, respectively. The emphasizer calculates first and second emphasized values. The first and second emphasized values are emphasized values corresponding to the first and second pixel signals, respectively. The synthesizer generates the emphasized image signal. In the emphasized image signal, the first and second pixel signals are replaced with the sum of the first and second emphasized values for each pixel and the first and second signal average values, respectively.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
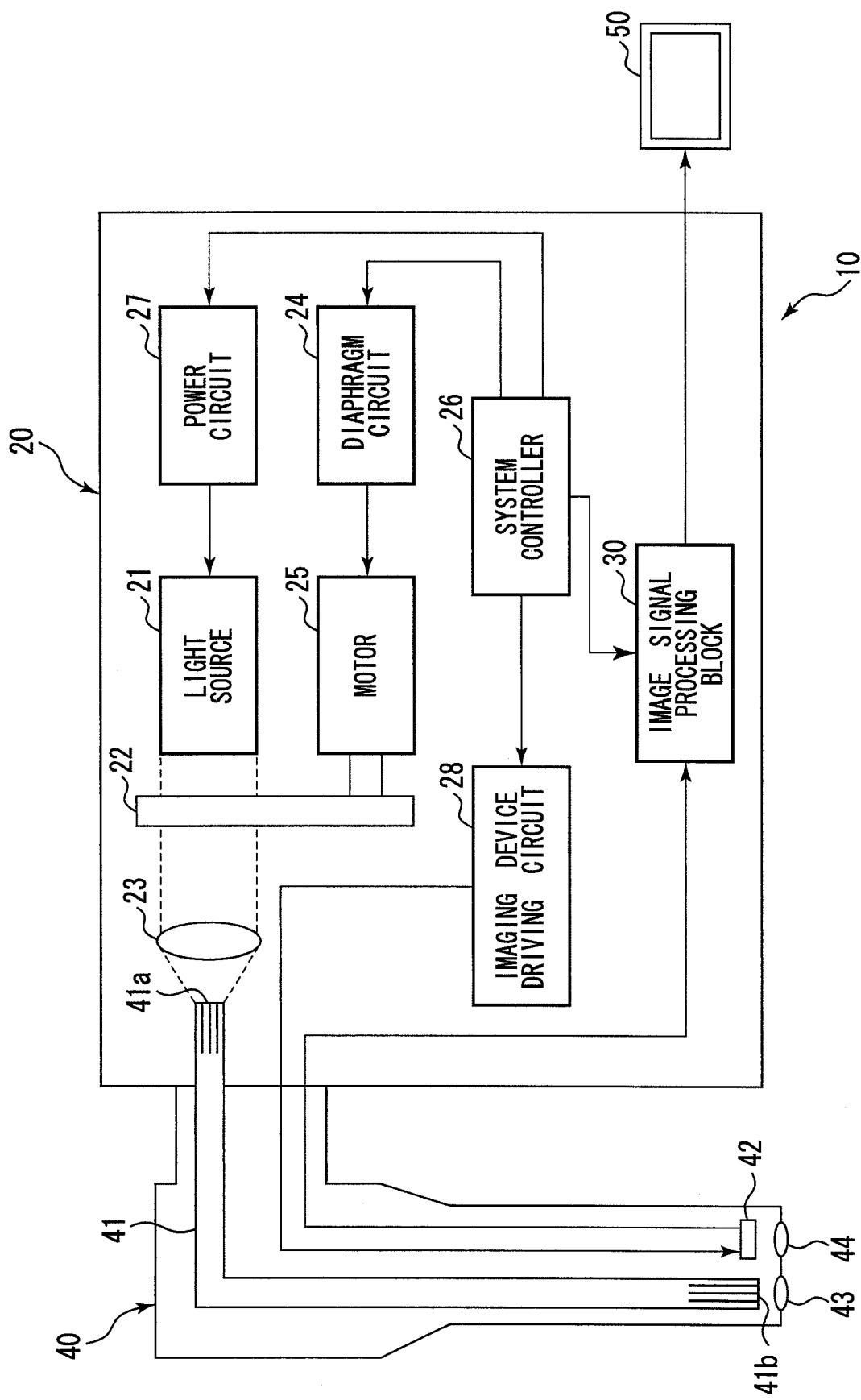
FIG. 1 is a block diagram showing the internal structure of an endoscope system having an endoscope processor as an embodiment of the present invention.

The present invention is described below with reference to the embodiments shown in the drawings.

In FIG. 1, an endoscope system 10 comprises an endoscope processor 20, an electronic endoscope 40, and a monitor 50. The endoscope processor 20 is connected to the electronic endoscope 40 and the monitor 50 via connectors (not depicted).

The whole structure of the endoscope system 10 is briefly explained. A light source 21 for illuminating an object (not depicted) is housed in the endoscope processor 20. The light emitted from the light source 21 is irradiated onto an object (not depicted) via a light guide 41 housed in the electronic endoscope 40.

An imaging device 42, such as a CCD image sensor, is mounted in the electronic endoscope 40. The image of an object which is irradiated by the illumination light is captured by the imaging device 42. Subsequently, an image signal corresponding to the image of the captured object is generated by the imaging device 42. The image signal is sent to the endoscope processor 20, where predetermined signal processing is carried out on the image signal. The image signal, having undergone the predetermined signal processing, is converted into a composite video signal and sent to the monitor 50, where the resulting image is displayed.

Next, each component of the endoscope system 10 is explained in detail, as follows: A diaphragm 22 and a condenser lens 23 are mounted in the optical path from the light source 21 to the incident end 41a of the light guide 41. The light, which is composed almost entirely of parallel light beams emitted by the light source 21, is made incident on, and condensed onto the incident end 41a by the condenser lens 23.

The intensity of the light, made incident on the incident end 41a, is controlled by adjusting the diaphragm 22. The diaphragm 22 is adjusted by a motor 25. The movement of the motor 25 is controlled by the diaphragm circuit 24. The diaphragm circuit 24 is connected to an image signal processing block 30 via a system controller 26. The image signal processing block 30 detects the magnitude of light received in a captured image of an object based on the image signal generated by the imaging device 42. The diaphragm circuit 24 calculates the necessary degree of adjustment for the motor 25 based on the magnitude of light received.

A power circuit 27, which supplies power to the light source 21, is electrically connected to the system controller 26. A control signal for switching the light source 21 on and off is output from the system controller 26 to the power circuit 27. Consequently, the lighting status (on and off) of the light source 21 is controlled by the system controller 26.

Further, the system controller 26 outputs a driving signal necessary for driving the imaging device 42, to an imaging device driving circuit 28. The imaging device 42, which is driven by the imaging device driving circuit 28, generates an image signal corresponding to the captured image of an object.

Further, the system controller 26 controls the activity of the whole endoscope processor 20. An image signal processing block 30 is also controlled by the system controller 26, as described later.

The light made incident on the incident end 41a is transmitted to the exit end 41b via the light guide 41. The transmitted light illuminates a peripheral area around the head end of the insertion tube of the electronic endoscope 40 after passing through a diffuser lens 43. An optical image of the illuminated object is focused onto the light receiving surface of the imaging device 42 by an object lens 44.

A plurality of pixels (not depicted) is arranged in two dimensions on the light receiving surface of the imaging device 42. Each pixel is covered with red, green, or blue color filter. Only red, green, or blue light components are able to pass through the red, green, and blue color filters, respectively. A light component produced by one of the color filters is made incident on the pixel that is covered by that color filter. Each pixel generates a pixel signal in accordance with the magnitude of the detected light component.

The image signal of one frame or one field captured by the imaging device 42 comprises a plurality of pixel signals generated by the plurality of the pixels on the light receiving surface.

The image signal generated by the imaging device 42 is sent to the image signal processing block 30 housed in the endoscope processor 20. The image signal processing block 30 carries out normal image processing or emphasizing image processing on the image signal so that a normal image or an emphasized image is displayed on the monitor 50, respectively. The normal image is the same as that of the captured image. The emphasized image is a partially-emphasized image of the normal image.

Figure 2:
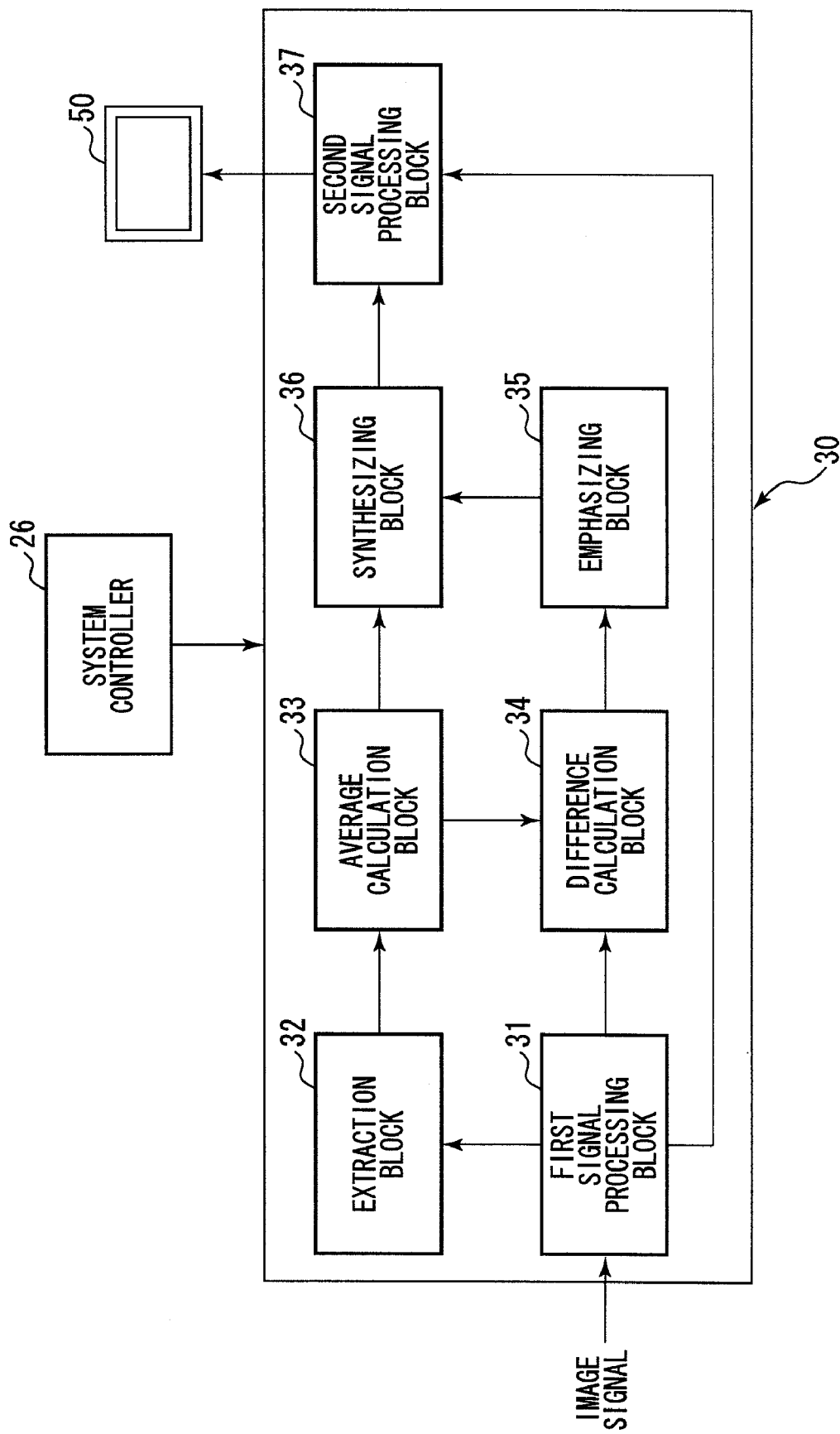
FIG. 2 is a block diagram showing the internal structure of the image signal processing block.

As shown in FIG. 2, the image signal processing block 30 comprises a first signal processing block 31, an extraction block 32, an average calculation block 33, a difference calculation block 34, an emphasizing block 35, a synthesizing block 36, and a second signal processing block 37.

When the emphasizing image processing is carried out, the first signal processing block 31, the extraction block 32, the average calculation block 33, the difference calculation block 34, the emphasizing block 35, the synthesizing block 36, and the second signal processing block 37 function, as described later. On the other hand, when the normal image processing is carried out, only the first and second signal processing blocks 31, 37 function.

The image signal generated by the imaging device 42 is sent to the first signal processing block 31. The first signal processing block 31 carries out predetermined signal processing, which includes color separation processing and color interpolation processing.

In the color separation processing, the image signal is separated into red, green, and blue signal components, which are pixel signals categorized in accordance with their specific magnitude of red, green, and blue light components, respectively. At this point, each pixel signal consists of only one of red, green, or blue color signal component because each pixel can directly generate only one color signal component corresponding to its covering color filter.

During the color interpolation processing, in addition to the generated color signal component, two additional color signal components inherent within each pixel signal prior to the color interpolation processing, are synthesized. For example, in a pixel signal generated by a pixel covered with a green color filter and consisting of a green color signal component, the red and blue color signal components corresponding to the pixel are synthesized. Each pixel signal then consists of all three color signal components.

Further, the image signal, which is an analog signal, is converted to image data, which is digital data.

When normal image processing is carried out, the image data is sent from the first signal processing block 31 to the second signal processing block 37. When emphasizing image processing is carried out, the image data is sent from the first signal processing block 31 to the extraction block 32 and the difference calculation block 34.

The extraction block 32 determines whether the data levels of red, green, and blue data components for each pixel for an entire image are within the predetermined range or not. The red, green, and blue data components are digital data converted from the red, green, and blue signal components, respectively. The data level of each color data component corresponds to the signal level of each color signal component.

Higher and lower limits of a predetermined range for the red data component, hereinafter referred to as HLr and LLr, respectively, are predetermined and memorized in a ROM (not depicted). Similarly, higher and lower limits of a predetermined range for the green data component, hereinafter referred to as HLg and LLg, respectively, are predetermined and memorized in the ROM. Similarly, higher and lower limits of a predetermined range for the blue data component, hereinafter referred to as HLb and LLb, respectively, are predetermined and memorized in the ROM. The extraction block 32 reads the HLr, LLr, HLg, LLg, HLb, and LLb from the ROM.

The extraction block 32 extracts a red data component whose data level is in the range between HLr and LLr. The extracted red data component is sent to the average calculation block 33. Similarly, the extraction block 32 extracts a green data component whose data level is in the range between HLg and LLg. The extracted green data component is sent to the average calculation block 33. Similarly, the extraction block 32 extracts a blue data component whose data level is in the range between HLb and LLb. The extracted blue data component is sent to the average calculation block 33.

The average calculation block 33 calculates the average value of a plurality of the received red data components within one field or frame of image data, hereinafter referred to as the red average value. Similarly, the average calculation block 33 calculates the average value of a plurality of the received green data components within one field or frame of image data, hereinafter referred to as the green average value. Similarly, the average calculation block 33 calculates the average value of a plurality of the received blue data components within one field or frame of image data, hereinafter referred to as the blue average value. The data of red, green, and blue average value is sent to the difference calculation block 34 and the synthesizing block 36.

The difference calculation block 34 also receives the image data, as described above. The difference calculation block 34 calculates a red difference value for each pixel by subtracting the received red average value from each of all the data level of the red data components included in one frame or one field of the image data corresponding to that red average value. Similarly, the difference calculation block 34 calculates a green difference value for each pixel by subtracting the received green average value from each of all the data level of the green data components included in one frame or one field of the image data corresponding to that green average value. Similarly, the difference calculation block 34 calculates a blue difference value for each pixel by subtracting the received blue average value from each of all the data level of the blue data components included in one frame or one field of the image data corresponding to that blue average value.

The data of the red, green, and blue difference values is sent to the emphasizing block 35. The emphasizing block 35 calculates red, green, and blue emphasized values for each pixel by multiplying the red, green, and blue difference values by a predetermined gain of more than one.

The data of the red, green, and blue emphasized value is sent to the synthesizing block 36. In addition, the data of the red, green, and blue average values is also sent to the synthesizing block 36, as described above.

The synthesizing block 36 generates emphasized image data that corresponds to the emphasized image. The emphasized image data is generated based on the red, green, and blue emphasized values and the red, green, and blue average values. How the synthesized image data is generated is explained in detail below.

The synthesizing block 36 calculates the sum of the red average value and the red emphasized value for each pixel. The sum of the red average value and the red emphasized value is designated as the magnitude of the red light component in the emphasized image for each pixel. Similarly, the synthesizing block 36 calculates the sum of the green average value and the green emphasized value for each pixel. The sum of the green average value and the green emphasized value is designated as the magnitude of the green light component in the emphasized image for each pixel. Similarly, the synthesizing block 36 calculates the sum of the blue average value and the blue emphasized value for each pixel. The sum of the blue average value and the blue emphasized value is designated as the magnitude of the blue light component in the emphasized image for each pixel.

The emphasized image data is then sent to the second signal processing block 37. The second signal processing block 37 carries out predetermined signal processing, such as contrast adjustment processing and enhancement processing, on the emphasized image data. In addition, D/A conversion processing is carried out for the emphasized image data, which is subsequently converted to an analog signal. Further, a composite video signal, which includes the image signal and a synchronizing signal is generated.

Incidentally, when normal image processing is carried out, the image data is sent from the first signal processing block 31 directly to the second signal processing block 37, which carries out predetermined data processing on the received image data and generates a composite video signal corresponding to the normal image.

The composite video signal is sent to the monitor 50, where an image based on the composite video signal is displayed.

Figure 3:
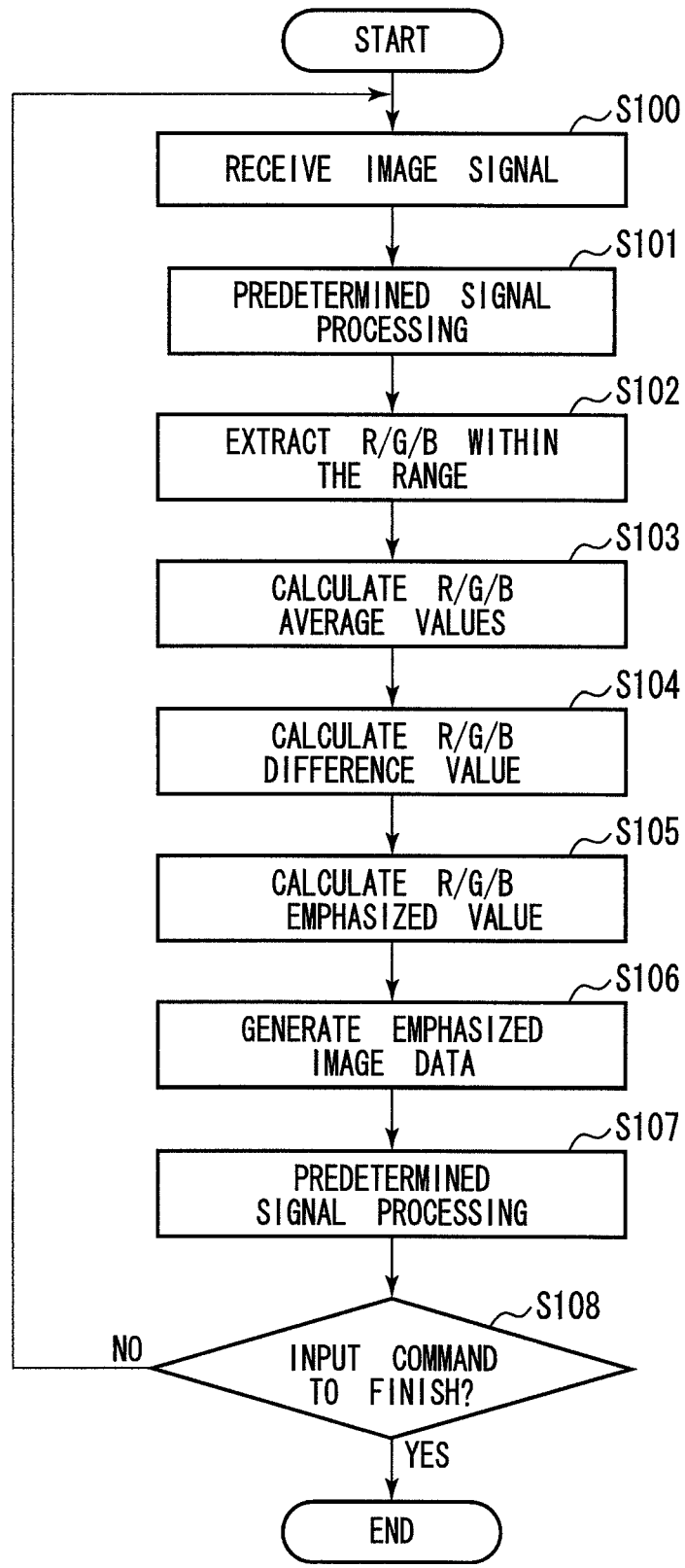
FIG. 3 is a flowchart describing the emphasizing image process, as carried out by the image signal processing block.

The emphasizing image processing is carried out by the image signal processing block 30, as explained below in relation to the flowchart in FIG. 3. The emphasizing image processing starts when a user inputs a command to start the emphasizing image processing.

At step S100, the first signal processing block 31 receives one frame or one field of an image signal from the imaging device 42. At step S101, the first signal processing block 31 carries out predetermined signal processing, which includes color separation processing and color interpolation processing. At this point red, green, and blue data components for each pixel are generated. After finishing the predetermined signal processing, the process proceeds to step S102.

At step S102, the extraction block 32 determines whether or not the data levels of red, green, and blue data components, which one frame or one field of the image data includes, are within the predetermined range. The extraction block 32 extracts the red, green, and blue data components which are within the predetermined range. After the extraction, the process proceeds to step S103.

At step S103, the average calculation block 33 calculates the red, green, and blue average values based on a plurality of the extracted red, green, and blue data components, respectively. After calculation of the average values, the process proceeds to step S104.

At step S104, the difference calculation block 34 calculates the red, green, and blue difference values based on the average values calculated at step S103 and the data level of red, green, and blue data components for each pixel. After calculation of the difference values, the process proceeds to step S105.

At step S105, the emphasizing block 35 calculates the red, green, and blue emphasized values for each pixel by multiplying the red, green, and blue difference values by the predetermined gain. After calculation of the emphasized values, the process proceeds to step S106.

At step S106, the synthesizing block 36 generates emphasized image data based on the red, green, and blue average values calculated at step S103 and the red, green, and blue emphasized values calculated at step S105. For the emphasized image data, the sum of the red emphasized value for each pixel and the red average value is designated as the magnitude of the red light component for each pixel. Similarly, in the emphasized image data, the sum of the green emphasized value for each pixel and the green average value is designated as the magnitude of the green light component for each pixel. Similarly, in the emphasized image data, the sum of the blue emphasized value for each pixel and the blue average value is designated as the magnitude of the blue light component for each pixel. After generation of the emphasized image data, the process proceeds to step S107.

At step S107, the second signal processing block 37 carries out predetermined signal processing including contrast adjustment processing and enhancement processing, on the emphasized image data, and generates a composite video signal. The second signal processing block 37 then sends the composite video signal to the monitor 50, where an image corresponding to the composite video signal is displayed.

At step S108, it is determined whether there is an input command to finish the emphasizing image processing present. If there is, the emphasizing image processing for the image signal finishes. If there is not, the process returns to step S100. The processes from step S100 to step S108 are repeated until there is an input command to finish the emphasizing image processing present.

In the above embodiment, an unclear image can be converted into a clear image. Accordingly, a lesion that is not distinguishable in a normal image can be displayed more clearly, as described below.

Consider an example where a mass of capillaries or an adenoma has formed under the surface of a lesion, such as a polyp. A doctor identifies such a lesion by observing the appearance of the mass of capillaries or adenoma. However, it is difficult to observe a mass of capillaries because both the surface of the internal organ and capillaries is reddish. In addition, it is difficult to identify a bulge, which is characteristic of an adenoma, because there is little change of color or brightness in the bulge.

However, the endoscope processor 20 generates an emphasized image, in which a small difference of brightness and color in the normal image is emphasized by magnifying the difference between the average values of the red, green, and blue signal components and the red, green, and blue signal components for each pixel. Accordingly, a doctor is easily able to identify a lesion such as a polyp without relying on skill.

In an image captured by an endoscope, the size of a lesion is generally much smaller than that of a normal organ, and the number of pixels corresponding to a lesion is much less than that of a normal organ. Consequently, in the above embodiment, the red, green, and blue average values are substantially equal to the average values of red, green, and blue data components of the pixels corresponding to a normal organ. Therefore, the average value can be regarded as a standard value of color data components corresponding to a normal organ. In the above embodiment, by generating the emphasized image data based on such average values, a lesion will be more distinguishable from a normal organ.

In addition, the color of the organ can be altered by adjusting the predetermined gains for multiplying the red, green, and blue difference values. In prior art, the pigment of a specified color, such as indigo, is used as a coloring in order to enhance the edges of an entire image. However, an image where an edge is enhanced by changing the level of a color in the image can be displayed without using a pigment.

In the above embodiment, the emphasized image data is generated by carrying out a calculation involving average values, difference values, and emphasized values for all of the red, green, and blue data components. However, even if the emphasized image data is generated by carrying out a calculation of their values for at least one color data component, an effect similar to the above embodiment can still be achieved.

In the above embodiment, each pixel of the imaging device 42 is covered with either a red, green, or blue color filter, and the emphasized image data is generated based on the red, green, and blue data components. However, each pixel of the imaging device 42 can also be covered with another color filter and the emphasized image data can be generated based on the color data components corresponding to the color filter covering the pixel.

In the above embodiment, the emphasized image data is generated based on red, green, and blue data components. However, the emphasized image data can also be generated based on other data components used to synthesize a color received at each pixel. For example, a luminance data component and a color difference data component for each pixel can be generated based on the red, green, and blue signal components for each pixel and the emphasized image data can be generated by carrying out the calculation of average values, difference values, and emphasized values on the luminance signal component and the color difference signal component.

In the above embodiment, the red average value is calculated using only red data components of which the data level is within the range between HLr and LLr, and the green average value is calculated using only green data components of which the data level is within the range between HLg and LLg, and the blue average value is calculated using only blue data components of which the data level is within the range between HLb and LLb. However, it is possible that the red, green, and blue average values could be calculated using red, green, and blue data components which have been filtered according to their signal level, using a higher limit, or a lower limit, or have not been filtered at all.

However, it is preferable to calculate the average value while excluding data components of which the data level is higher than an upper limit or lower than a lower limit. Generally speaking, if a pixel detects a component which is extremely dark or extremely bright, it does not corresponding to an object which needs to be observed. In addition, the average value may be too low or too high if there are many pixels which are extremely dark or extremely bright, respectively. Consequently, an emphasized image based on the average value of all the detected data components may be too dark or bright to correctly observe an object when compared to the emphasized image based on the average value of the data components within a predetermined range.

The above embodiment can be implemented by installing a computer program for emphasizing an image onto an all-purpose endoscope processor. The program for emphasizing an image comprises a controller code segment for receiving, an average calculation block code segment, a difference calculation code segment, an emphasizing block code segment, a synthesizing block code segment, and a driver code segment for the output.

In the above embodiment, the endoscope processor 20 carries out signal processing on the image signal generated by the electronic endoscope 40, which comprises an insert tube to be inserted from outside. However, the endoscope processor can also carry out signal processing on an image signal generated by any other electronic endoscope, such as a capsule endoscope.

Furthermore, in the above embodiment, the endoscope processor 20 receives the image signal, and carries out the above signal processing on the received image signal in real time. However, an endoscope image playback apparatus, which receives an image signal stored in internal or external memory, then carries out the above signal processing, including the emphasizing image processing, on the stored image signal while playing back the stored images.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-136541 (filed on May 16, 2006), which is expressly incorporated herein, by reference, in its entirety.

The invention claimed is:

1. An endoscope processor, comprising:
   a signal receiver that receives an image signal, said image signal being generated based on an optical image captured at a light receiving surface on an imaging device, said image signal comprising a plurality of pixel signals, said pixel signals being generated by a plurality of pixels according to the amounts of received light, the plurality of said pixels being arranged on said light receiving surface on said imaging device;

an average calculator that calculates the signal average value, said signal average value being the average of the signal levels of said pixel signals that one frame or one field of said image signal comprises;

a difference calculator that calculates a signal difference value, said signal difference value being the difference between the signal level of said pixel signal for said each pixel and the signal level of said signal average value;

an emphasizer that calculates an emphasized value by multiplying said signal difference value by a predetermined gain;

a synthesizer that generates an emphasized image signal, in which said pixel signal for said each pixel is replaced with the sum of said emphasized value for said each pixel and said signal average value; and an output block that outputs said emphasized image signal.

2. An endoscope processor according to claim 1, wherein said average calculator calculates said signal average value using said pixel signals, which are filtered according to their signal level, by a higher or lower limit, or both.

3. An endoscope processor according to claim 1, wherein,
each of said pixels is covered with a first or second color filter, first and second said pixels covered with said first and second color filter generate first and second pixel signals, respectively said average calculator calculates first and second signal average values, said first and second signal average values being said signal average values corresponding to said first and second pixel signals, respectively, said difference calculator calculates first and second signal difference values, said first and second signal difference values being said signal difference values corresponding to said first and second pixel signals, respectively, said emphasizer calculates first and second emphasized values, said first and second emphasized values being said emphasized values corresponding to said first and second pixel signals, respectively, and said synthesizer generates said emphasized image signal, in which said first and second pixel signals are replaced with the sum of said first and second emphasized values for each pixel and said first and second signal average values, respectively.

4. A non-transitory computer readable medium storing a computer program product, said computer program product comprising: a first controller that activates a signal receiver so that said signal receiver receives an image signal based on an optical image captured at a light receiving surface on an imaging device, said image signal comprising a plurality of pixel signals, said pixel signals being generated by a plurality of pixels according to the amounts of received light, the plurality of said pixels being arranged on said light receiving surface on said imaging device; an average calculator that calculates a signal average value, said signal average value being the average of the signal levels of pixel signals that one frame or one field of said image signal comprises; a difference calculator that calculates a signal difference value, said signal difference value being the difference between the signal level of said pixel signal for said each pixel and said signal average value; an emphasizer that calculates an emphasized value by multiplying said signal difference value by a predetermined gain; a synthesizer that generates an emphasized image signal, of which said pixel signal for said each pixel is replaced with the sum of said emphasized value for said each pixel and said signal average value; and a second controller that activates an output block in order that said output block outputs said emphasized image signal.

5. An endoscope system, comprising:

an electronic endoscope having an imaging device that generates an image signal based on an optical image captured at a light receiving surface on said imaging device, said image signal comprising a plurality of pixel signals, said pixel signals being generated by a plurality of pixels according to the amounts of received light, the plurality of said pixels being arranged on said light receiving surface on said imaging device;

an average calculator that calculates a signal average value, said signal average value being the average of the signal levels of pixel signals that one frame or one field of said image signal comprises;

a difference calculator that calculates a signal difference value, said signal difference value being the difference between the signal level of said pixel signal for said each pixel and said signal average value;

an emphasizer that calculates an emphasized value by multiplying said signal difference value by a predetermined gain;

a synthesizer that generates emphasized image signal, in which the pixel signal for said each pixel is replaced with the sum of said emphasized value for said each pixel and said signal average value; and a monitor on which an emphasized image corresponding to said emphasized image signal is displayed.

6. An endoscope image playback apparatus, comprising:

a memory that receives and stores an image signal sent from an electronic endoscope, said electronic endoscope having an imaging device and an output block, said imaging device generating an image signal based on an optical image captured at a light receiving surface on said imaging device, said image signal comprising a plurality of pixel signals, said pixel signals being generated by a plurality of pixels according to the amounts of received light, the plurality of said pixels being arranged on said light receiving surface on said imaging device;

an average calculator that calculates a signal average value, said signal average value being the average of the signal levels of said pixel signals that one frame or one field of said image signal comprises, said image signal being stored in said memory;

a difference calculator that calculates a signal difference value, said signal difference value being the difference between the signal level of said pixel signal for said each pixel and said signal average value;

an emphasizer that calculates an emphasized value by multiplying said signal difference value by a predetermined gain;

a synthesizer that generates an emphasized image signal, in which said pixel signal for said each pixel is replaced with the sum of said emphasized value for said each pixel and said signal average value; and an image player that orders a monitor to display an image corresponding to said emphasized image signal.

* * * * *